M. F. KARASCH.
AUTO LOCK.
APPLICATION FILED JULY 23, 1918.
1,316,450. Patented Sept. 16, 1919.
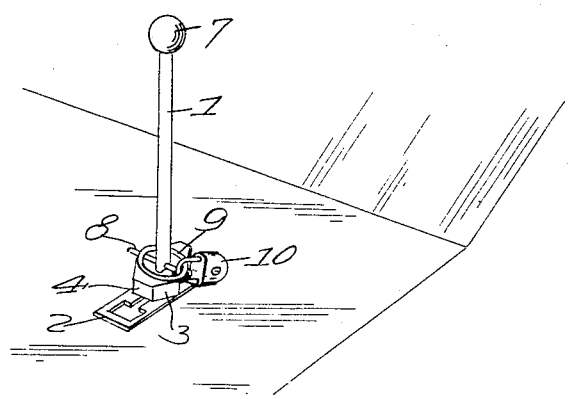
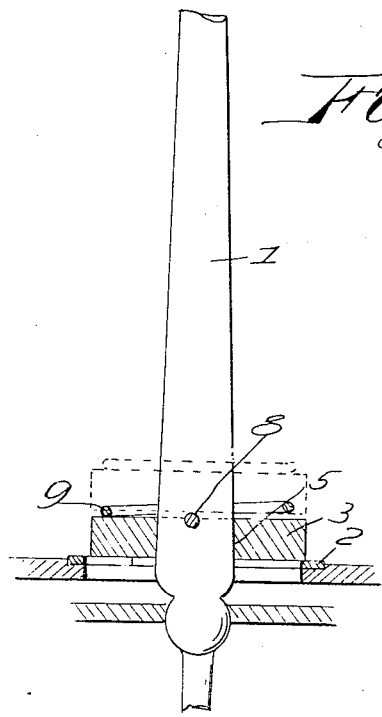
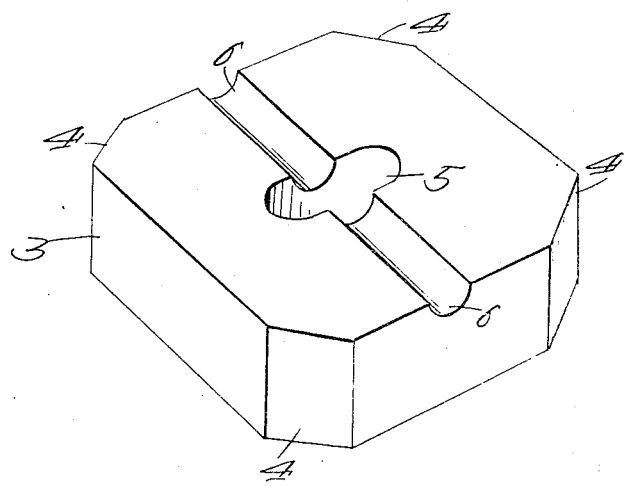
Inventor
M. F. Karasch
By G. Hume Talbert
Attorney

UNITED STATES PATENT OFFICE.

MIKE F. KARASCH, OF INDEPENDENCE, WISCONSIN.

AUTO-LOCK.

1,316,450. Specification of Letters Patent. Patented Sept. 16, 1919.

Application filed July 23, 1918. Serial No. 246,344.

*To all whom it may concern:*

Be it known that I, MIKE F. KARASCH, a citizen of the United States of America, residing at Independence, in the county of Trempealeau and State of Wisconsin, have invented new and useful Improvements in Auto-Locks, of which the following is a specification.

The principal object of the invention is to provide means for effectively locking in the neutral position the shifting lever for the gears in the transmission mechanism of an auto vehicle.

A further object of the invention is to provide a lock of this nature which may be readily applied to such lever so that it will perform its function and require only the drilling of a hole in the lever to permit the effective performance of this function.

A still further object seeks the provision of a locking device of the character mentioned which is simple in construction, durable in use and inexpensive to manufacture.

Still further and other objects will appear in the following detailed description.

To the exact embodiment to which it is shown and described, the invention is not to be restricted. The right is reserved to make such changes or alterations as the actual reduction to practice may suggest, in so far as such changes or alterations are compatible with the spirit of the annexed claim.

In the accompanying drawings:

Figure 1 is a perspective view showing the shifting lever of an auto vehicle transmission gears and showing the improved locking device attached thereto.

Fig. 2 is a sectional view through a portion of the structure shown in Fig. 1.

Fig. 3 is a perspective view of the block against which the locking pin engages.

Referring to the drawings, there is shown the transmission gearing shifting lever 1 and the base plate 2 through which the lever projects to enter the interior of the car from the transmission case below.

The improved lock is in the form of a block 3 made preferably substantially square in plan and having the corners removed, as shown at 4, so that there may not be any sharp corners which may engage and cut the hands in the use of the device. At its center, the block here is provided with the eye or aperture 5 corresponding in shape to the cross sectional shape of the lever 1. Farther than the eye 5, the block is provided on one face with the diagonally disposed recess 6 crossing the eye and extending from one corner 4 to the diagonally opposite corner.

In applying the device, the handle 7 is removed, whereupon the block is attached to the lever 6 having the latter passed through its eye 5. The block then rests upon the plate 2 after having been placed on the lever so that the recess 6 is upward. The lever 2 is then drilled transversely to receive the pin 8, the position of this hole being such that when the lever is in the neutral position the block 3 rests upon the plate 2 and the pin 8 lies in the bottom of the recess 6. The oval shaped ring 9 which is placed over the lever 1 after the block is attached thereon is then locked to the pin by means of a lock 10, the lock engaging both the eye 10 of the pin and the ring 9. It will thus be observed that the pin cannot be withdrawn as long as it is engaged by the lock and the lock engaged with the ring. Therefore, the lever 1 cannot be moved, since the block is held tight against the plate 2 and resists any force tending to shift the lever angularly from its neutral position.

To unlock the device, the lock 10 is disengaged, whereupon the pin 8 may be withdrawn from the lever and the block 3 raised, so that the pin may be inserted beneath the block. Thereafter the block is held in such a position that the necessary movement may be imparted to the lever to effect the desired shifting of the gears in the transmission mechanism.

From the foregoing description and the accompanying drawings it is believed a clear enough understanding of the invention will be had to make further description unnecessary.

The invention having been described what is claimed as new and useful is:

The combination with a transmission gear shifting lever and floor plate therefor, of a block having an eye formed therein through which the said lever passes, the block resting upon the floor plate and having on its upper face a recess extending clear across the face and across the eye, the lever having a transverse hole formed therein so that when the lever is in neutral position one side thereof will register with the wall of the recess, a pin inserted through the hole in the lever and lying in the said recess in the block, the pin having an eye formed at one end, an oval shaped ring in surrounding relation to the lever, and a lock securing the ring to the eye of the pin, all for the useful purpose specified.

In testimony whereof I affix my signature.

MIKE F. KARASCH.